United States Patent
Mochizuki et al.

(10) Patent No.: US 9,273,745 B2
(45) Date of Patent: Mar. 1, 2016

(54) SHOCK ABSORBER

(75) Inventors: Takahisa Mochizuki, Kani (JP); Yuuki Amano, Kakamigahara (JP)

(73) Assignee: KYB CORPORATION, Tokyo (JP)

( * ) Notice: Subject to any disclaimer, the term of this patent is extended or adjusted under 35 U.S.C. 154(b) by 105 days.

(21) Appl. No.: 14/128,219

(22) PCT Filed: Jun. 14, 2012

(86) PCT No.: PCT/JP2012/065230
§ 371 (c)(1),
(2), (4) Date: Dec. 20, 2013

(87) PCT Pub. No.: WO2012/176682
PCT Pub. Date: Dec. 27, 2012

(65) Prior Publication Data
US 2014/0124314 A1 May 8, 2014

(30) Foreign Application Priority Data

Jun. 23, 2011 (JP) ................................. 2011-139045

(51) Int. Cl.
*F16F 9/46* (2006.01)
*B62K 25/08* (2006.01)
*B62K 25/04* (2006.01)

(52) U.S. Cl.
CPC ................. *F16F 9/461* (2013.01); *B62K 25/08* (2013.01); *F16F 9/466* (2013.01); *B62K 2025/048* (2013.01)

(58) Field of Classification Search
CPC .............. F16F 9/461; F16F 9/46; F16F 9/462
USPC .................... 188/282.4, 313, 322.13, 322.22, 188/322.15, 317
See application file for complete search history.

(56) References Cited

U.S. PATENT DOCUMENTS

| | | | | |
|---|---|---|---|---|
| 5,043,649 | A | * | 8/1991 | Murakami et al. ............ 318/696 |
| 5,911,290 | A | * | 6/1999 | Steed .......................... 188/282.4 |
| 8,813,922 | B2 | * | 8/2014 | Mochizuki ..................... 188/313 |
| 2011/0186394 | A1 | * | 8/2011 | Born ........................ 188/322.13 |

FOREIGN PATENT DOCUMENTS

| | | |
|---|---|---|
| EP | 1876090 A1 | 1/2008 |
| JP | 2003-194252 A | 7/2003 |
| JP | 2005-140262 | 6/2005 |
| JP | 2008-014431 A | 1/2008 |
| JP | 2010-064582 A | 3/2010 |
| JP | 2012-107696 A | 6/2012 |

OTHER PUBLICATIONS

Extended European Search Report dated Mar. 26, 2015.

* cited by examiner

*Primary Examiner* — Melanie Torres Williams
(74) *Attorney, Agent, or Firm* — Rabin & Berdo, P.C.

(57) ABSTRACT

A shock absorber includes a damping force adjustment mechanism having a flow passage that allows the fluid from a cylinder, a valve seat, a valve body, and a stepper motor that adjusts a flow passage area by driving the valve body. A valve body position in which step-out may occur in the stepper motor if the valve body is moved further toward the valve seat therefrom is set as a step-out boundary position, a zone between a seated position in which the valve body is seated on the valve seat and the step-out boundary position is set as a step-out zone, and when the valve body is to be moved to the seated position through the step-out zone, the stepper motor is energized to move the valve body by a distance that is at least twice a distance to the seated position.

8 Claims, 5 Drawing Sheets

SHOCK ABSORBER

TECHNICAL FIELD

This invention relates to an improvement in a shock absorber.

BACKGROUND ART

JP2008-14431A discloses a shock absorber that is installed in a front fork of a motorcycle to perform damping force adjustment using a motor. The shock absorber includes a shock absorber main body having a cylinder coupled to an outer tube, a piston that is inserted in the cylinder to be free to slide and divides an interior of the cylinder into a contraction side chamber and an expansion side chamber, and a piston rod that is inserted into the cylinder such that one end thereof is coupled to an inner tube, which is inserted into the outer tube to be free to slide, and another end is coupled to the piston. The shock absorber further includes a passage connecting the contraction side chamber and the expansion side chamber of the shock absorber main body, a check valve provided midway in the passage to allow only a flow traveling from the contraction side chamber toward the expansion side chamber or conversely to allow only a flow traveling from the expansion side chamber toward the contraction side chamber, a needle valve provided midway in the passage, and a stepper motor that is fixed to the other end side of the piston rod in order to drive the needle valve.

During expansion, the shock absorber generates damping force by applying resistance to a flow of working oil using a piston valve provided in the piston, and during contraction, the shock absorber generates damping force by applying resistance to a flow of working oil flowing out of the cylinder into a reservoir using a base valve provided in an end portion of the cylinder.

Further, in this shock absorber, the working oil is caused to flow through the passage either only during expansion or only during contraction by an action of the check valve. By having the needle valve apply resistance to this flow of working oil, the needle valve generates damping force cooperatively during either expansion or contraction of the shock absorber. Furthermore, by driving the needle valve using the motor, the damping force generated by the needle valve can be varied.

Hence, the needle valve performs a damping function only during expansion or contraction of the shock absorber. A front fork that straddles a vehicle wheel of a motorcycle typically straddles the vehicle wheel in a left-right pair. Therefore, the needle valve of the shock absorber built into one front fork performs the damping function during expansion, and the needle valve of the shock absorber built into the other front fork performs the damping function during contraction. As a result, the expansion side damping force and the contraction side damping force can be adjusted by the front fork as a whole.

According to this shock absorber, the flow of working oil passing through the needle valve always travels in one direction and is therefore a stable flow. As a result, the damping force generated by the shock absorber can be adjusted accurately.

SUMMARY OF INVENTION

Incidentally, in a case where the passage is blocked by the needle valve, the needle valve must be driven so as to overcome a fluid force and a pressure generated by the working oil flow in order to block the passage. To block the passage while the shock absorber is operative and the working oil is flowing through the passage, therefore, a stepper motor capable of outputting a large torque must be used. To cause the stepper motor to output a large torque, a size and a cost of the stepper motor must be increased, and it may therefore be necessary to sacrifice economic efficiency and ease of installation in a vehicle.

When the passage is blocked while the working oil flows through the passage, the needle valve can be driven by a comparatively small torque up to a point immediately before the passage is blocked, and in this condition, step-out is unlikely to occur. In a conventional shock absorber, therefore, the passage is not blocked completely so that a stepper motor having a comparatively small maximum torque can be used, and in so doing, the problem described above can be solved.

With this configuration, however, the passage cannot be blocked, and therefore a flow passage variation width of the needle valve inevitably decreases. Accordingly, a damping force adjustment width of the shock absorber decreases, and when step-out occurs in the stepper motor during travel, the step-out cannot be corrected during travel. As a result, the damping force cannot be adjusted correctly.

This invention has been designed in consideration of the problems described above, and an object thereof is to enable the use of a small, inexpensive motor, and to increase a damping force adjustment width by making step-out correction possible.

According to one aspect of this invention, a shock absorber includes: a shock absorber main body having a cylinder housing a fluid, a piston that is inserted into the cylinder to be free to slide and divides an interior of the cylinder into a contraction side chamber and an expansion side chamber, and a piston rod inserted into the cylinder and coupled to the piston; and a damping force adjustment mechanism having a flow passage that allows the fluid from the cylinder to pass during only one of an expansion operation and a contraction operation of the shock absorber main body, a valve seat provided midway in the flow passage, a valve body capable of advancing and retreating relative to the valve seat, and a stepper motor that is configured to adjust a flow passage area by driving the valve body to advance and retreat relative to the valve seat. A valve body position in which step-out may occur in the stepper motor if the valve body is moved further toward the valve seat therefrom is set as a step-out boundary position, and a zone between a seated position in which the valve body is seated on the valve seat and the step-out boundary position is set as a step-out zone. When the valve body is to be moved to the seated position through the step-out zone, the stepper motor is energized to move the valve body by a distance that is at least twice a distance to the seated position.

The details as well as other features and advantages of this invention are set forth in the remainder of the specification and are shown in the accompanying drawings.

DESCRIPTION OF EMBODIMENTS

Referring to the figures, a shock absorber 1 according to an embodiment of this invention will now be described.

Figure 1:
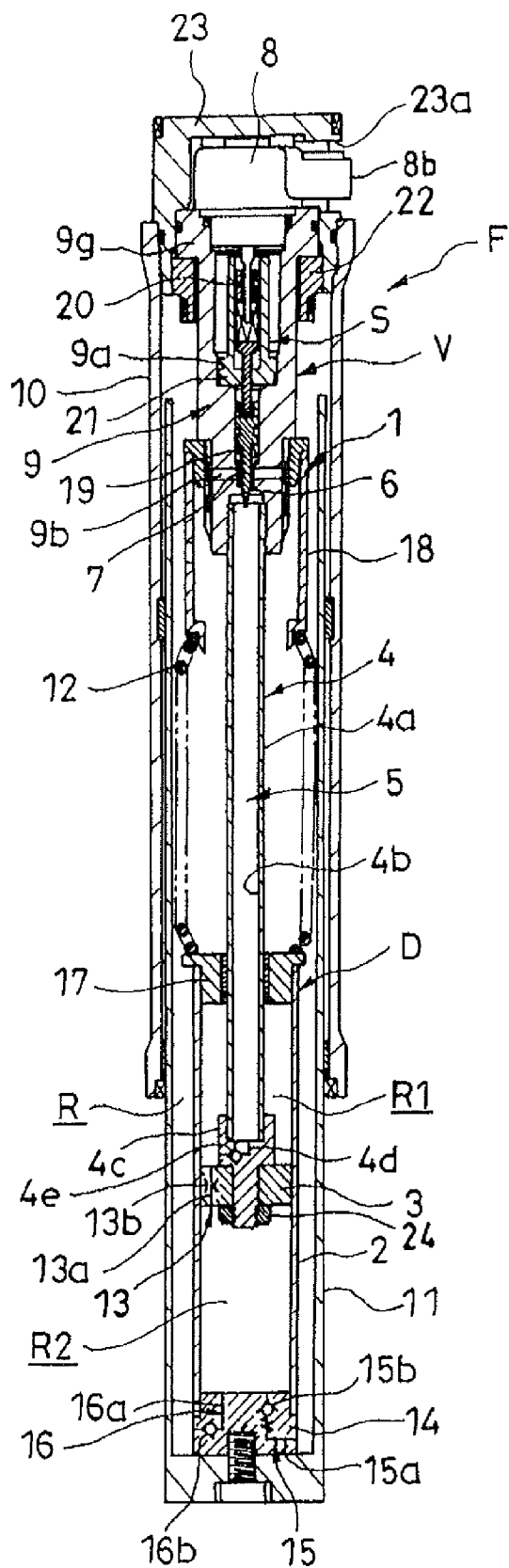
FIG. 1 is a sectional view of a shock absorber according to an embodiment of this invention.

As shown in FIG. 1, the shock absorber 1 includes a shock absorber main body D having a cylinder 2 housing a fluid, a piston 3 that is inserted into the cylinder 2 to be free to slide and divides an interior of the cylinder 2 into a contraction side chamber R1 and an expansion side chamber R2, and a piston rod 4 that is inserted into the cylinder 2 and coupled to the piston 3. The shock absorber 1 also includes a damping force adjustment mechanism V having a flow passage 5 that allows the fluid to pass only when the shock absorber main body D expands, a valve seat 6 provided midway in the flow passage 5, a valve body 7 capable of advancing and retreating relative to the valve seat 6, and a stepper motor 8 that adjusts a flow passage area by driving the valve body 7 to advance and retreat relative to the valve seat 6.

Figure 2:
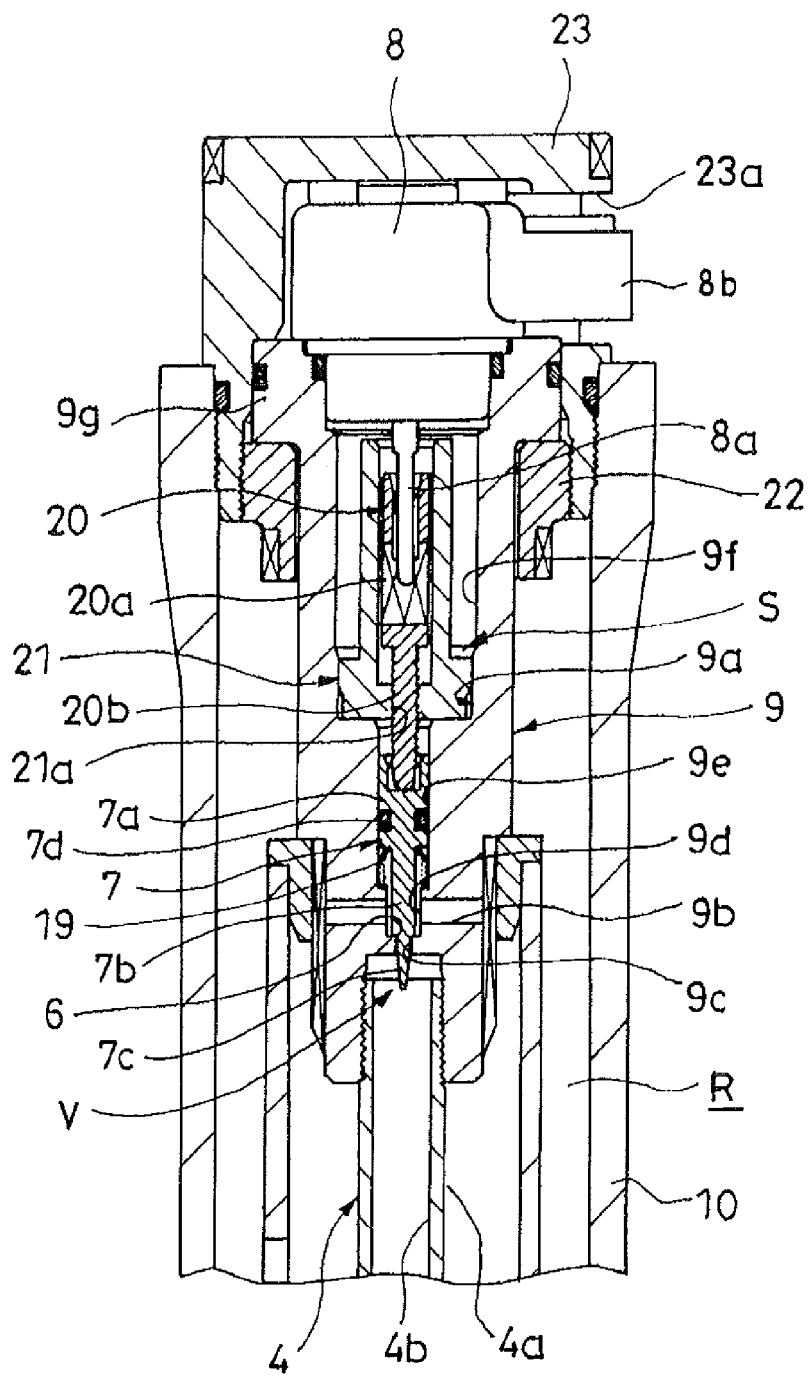
FIG. 2 is an enlarged sectional view of a damping force adjustment mechanism provided in the shock absorber according to this embodiment of this invention.

Referring to FIGS. 1 and 2, each part will now be described in detail.

The shock absorber main body D is housed in a front fork F constituted by a vehicle body side tube 10 coupled to a vehicle body, not shown in the figures, of a saddle-ridden vehicle such as a motorcycle, and an axle side tube 11 that is coupled to an axle, not shown in the figures, of the saddle-ridden vehicle and inserted into the vehicle body side tube 10 to be free to slide. More specifically, the shock absorber main body D is interposed between the vehicle body side tube 10 and the axle side tube 11 by coupling the piston rod 4 to the vehicle body side tube 10 and coupling the cylinder 2 to the axle side tube 11. The shock absorber main body D is housed in the front fork F, which is enclosed by the vehicle body side tube 10 and the axle side tube 11. It should be noted that in the shock absorber main body D, the front fork F is an inverted front fork in which the axle side tube 11 is inserted into the vehicle body side tube 10, but a normal front fork in which the vehicle body side tube 10 is inserted into the axle side tube 11 may be used instead.

A suspension spring 12 is interposed between the piston rod 4 and the cylinder 2 of the shock absorber main body D. The suspension spring 12 generates elastic force in a direction for separating the vehicle body side tube 10 and the axle side tube 11 via the shock absorber main body D, or in other words a direction for expanding the front fork F. The vehicle body of the saddle-ridden vehicle is elastically supported by the suspension spring 12.

Next, the shock absorber main body D installed in the front fork F will be described.

As shown in FIG. 1, the shock absorber main body D includes the cylinder 2, which is coupled to the axle side tube 11, the piston 3 that is inserted into the cylinder 2 to be free to slide and divides the interior of the cylinder 2 into two working chambers, namely the contraction side chamber R1 and the expansion side chamber R2, and the piston rod 4 that is coupled to the piston 3 at one end and coupled to the vehicle body side tube 10 at another end. The shock absorber main body D also includes a damping passage 13 that is provided in the piston 3 to connect the contraction side chamber R1 to the expansion side chamber R2 and apply resistance to a flow of fluid passing through, and a bottom member 14 provided on a lower end of the cylinder 2. The bottom member 14 includes a contraction side damping passage 15 that applies resistance to a flow of fluid traveling from the expansion side chamber R2 toward a reservoir R, and a suction passage 16 that allows the fluid to flow only from the reservoir R toward the contraction side chamber. A fluid such as working oil is charged into the contraction side chamber R1 and the expansion side chamber R2 as the fluid, while the fluid and a gas are charged into the reservoir R.

More specifically, the cylinder 2 is fixed to a bottom portion of the axle side tube 11, which is formed in the shape of a closed-end cylinder, via the bottom member 14, which is fitted to the lower end thereof. Further, a rod guide 17 that supports the piston rod 4 axially to be free to slide is provided on an upper end of the cylinder 2. The piston rod 4 includes a piston rod main body 4a that is formed in a tubular shape and has a hollow portion 4b, and a piston coupling portion 4c that is fixed to one end portion (a lower end in FIG. 1) of the piston rod main body 4a in order to hold the piston 3. Another end portion (an upper end in FIG. 1) of the piston rod 4 is fixed to an upper end of the vehicle body side tube 10 via a valve housing 9 housing the valve body 7 of the damping force adjustment mechanism V. The piston coupling portion 4c includes a connecting passage 4d connecting the hollow portion 4b to the contraction side chamber R1, and a check valve 4e provided midway in the connecting passage 4d to allow the fluid to flow only from the contraction side chamber R1 toward the hollow portion 4b. The annular piston 3 positioned on the lower end of the piston coupling portion 4c in FIG. 1 is fixed to the piston coupling portion 4c using a piston nut 24.

The aforesaid suspension spring 12 is interposed between a tubular spring bearing 18 provided on an outer periphery of the valve housing 9, and the rod guide 17. The shock absorber main body D is biased in an expansion direction by the suspension spring 12, whereby the front fork F is also biased in the expansion direction.

The piston 3 is fixed to a lower end portion of the piston rod 4 positioned at the lower end in FIG. 1. The damping passage 13 provided in the piston 3 includes a passage 13a connecting the contraction side chamber R1 to the expansion side chamber R2, and a damping valve 13b provided midway in the passage 13a. The damping passage 13 applies resistance to a flow of fluid passing through. Here, the damping valve 13b is a throttle valve. Accordingly, the damping passage 13 allows the fluid to flow both from the contraction side chamber R1 toward the expansion side chamber R2 and from the expansion side chamber R2 toward the contraction side chamber R1. This invention is not limited to this configuration, however, and instead, two or more passages may be provided such that a damping valve that allows the fluid to flow only from the contraction side chamber R1 toward the expansion side chamber R2 is provided in one passage and a damping valve that allows the fluid to flow only from the expansion side chamber R2 toward the contraction side chamber R1 is provided in another passage.

The reservoir R is formed in a space between the shock absorber main body D and the front fork F. The fluid and a gas are charged into the reservoir R. The contraction side damping passage 15 formed in the bottom member 14 includes a passage 15a connecting the expansion side chamber R2 to the reservoir R, and a damping valve 15b that allows the fluid to flow only from the expansion side chamber R2 toward the reservoir R and applies resistance to the flow of fluid passing through. The contraction side damping passage 15 is a one-way passage that allows the fluid to flow only from the expansion side chamber R2 toward the reservoir R. Meanwhile, the suction passage 16 formed in the bottom member 14 includes a passage 16a connecting the expansion side chamber R2 to the reservoir R, and a check valve 16b that allows the fluid to flow only from the reservoir R toward the expansion side chamber R2. The suction passage 16 is a one-way passage that allows the fluid to flow only from the reservoir R toward the expansion side chamber R2, i.e. in an opposite direction to the contraction side damping passage 15.

Next, the damping force adjustment mechanism V will be described.

As described above, the damping force adjustment mechanism V includes the flow passage 5 that connects the contraction side chamber R1 to the reservoir R and allows the fluid to pass only from the contraction side chamber R1 toward the reservoir R, the valve seat 6 provided midway in the flow passage 5, the valve body 7 that is capable of advancing and retreating relative to the valve seat 6, and the stepper motor 8 that adjusts the flow passage area by driving the valve body 7 to advance and retreat relative to the valve seat 6.

More specifically, the flow passage 5 includes the hollow portion 4b and the connecting passage 4d provided in the piston rod 4, a hollow portion 9a that is provided in the valve housing 9 coupled to an end portion (the upper end portion in FIG. 1) of the piston rod 4 so as to communicate with the hollow portion 4b, and a lateral hole 9b that connects the hollow portion 9a to the reservoir R. The flow passage 5 connects the contraction side chamber R1 to the reservoir R, and allows the fluid to pass only from the contraction side chamber R1 into the reservoir R using the check valve 4e provided midway in the connecting passage 4d. The check valve that sets the flow passage 5 as a one-way passage may be provided in a location other than the piston coupling portion 4c. More specifically, the check valve may be provided in the hollow portion 4b of the piston rod main body 4a, for example. The check valve may also be provided at an open end of the hollow portion 4b in an end portion (the upper end portion in FIG. 1) of the piston rod main body 4a.

As shown in FIG. 2, the valve housing 9 is formed in a tubular shape. The valve housing 9 includes the hollow portion 9a formed in an interior thereof, the lateral hole 9b that opens sideward so as to communicate with the hollow portion 9a, and a flange 9g provided on an outer periphery. Further, the hollow portion 9a includes a small diameter portion 9c formed with a small inner diameter further toward a piston rod side (a lower side in FIG. 1) than an intersection portion with the lateral hole 9b, a lateral hole intersection portion 9d which is connected to the small diameter portion 9c, has a larger inner diameter than the small diameter portion 9c, and intersects the lateral hole 9b, a valve housing portion 9e which is formed with a larger inner diameter than the lateral hole intersection portion 9d and into which the valve body 7 is inserted to be free to slide, and an enlarged diameter portion 9f formed with a larger inner diameter than the valve housing portion 9e. The valve seat 6 is formed in the hollow portion 9a by a step serving as a boundary between the small diameter portion 9c and the lateral hole intersection portion 9d. In other words, the valve seat 6 is formed in the valve housing 9 and provided on a tip end of the piston rod 4.

The valve body 7 includes a trunk portion 7a that slides against the valve housing portion 9e, a valve portion 7b that extends from the trunk portion 7a toward the valve seat 6 side and has an outer diameter which is smaller than the trunk portion 7a and larger than the inner diameter of the small diameter portion 9c, a needle-shaped valve head 7c that extends from a tip end (a lower end in FIG. 1) of the valve portion 7b and can be inserted into the small diameter portion 9c, and an annular seal ring 7d that is attached to an outer periphery of the trunk portion 7a so as to slide against an inner periphery of the valve housing portion 9e. The valve body 7 is biased in a separation direction from the valve seat 6 by a coil spring 19 interposed between an end portion (a lower end in FIG. 1) of the trunk portion 7a and a step formed in the hollow portion 9a as a boundary between the lateral hole intersection portion 9d and the valve housing portion 9e.

The valve body 7 is housed in the hollow portion 9a to be capable of advancing and retreating relative to the valve seat 6, or in other words capable of moving in an axial direction. The valve body 7 is provided to be capable of advancing and retreating relative to the valve seat 6 when driven by the stepper motor 8. As shown in FIG. 2, when the valve body 7 is driven such that an outer periphery of an end portion (a lower end in FIG. 1) of the valve portion 7b of the valve body 7 opposing the valve seat 6 moves to a seated position contacting the valve seat 6, the flow passage 5 is blocked. When the valve body 7 moves away from the valve seat 6 from a condition in which the flow passage 5 is blocked in this manner, the valve portion 7b separates from the valve seat 6, causing a gap to form, and as a result, the flow passage 5 is opened.

Further, in a condition where the valve portion 7b is separated from the valve seat 6 such that the flow passage 5 is open, a gap between the valve head 7c and an inner edge of the valve seat 6 increases as the valve portion 7b separates from the valve seat 6. As a result, the flow passage area of the damping force adjustment mechanism V can be varied. In other words, the flow passage area of the damping force adjustment mechanism V can be modified in accordance with a positional relationship between the valve body 7 and the valve seat 6.

When the valve body 7 moves to a maximum separation position in which the valve body 7 is furthest separated from the valve seat 6, the flow passage area of the damping force adjustment mechanism V reaches a maximum. When the valve body 7 moves to the seated position so as to be seated on the valve seat 6, the flow passage 5 is completely blocked, and therefore the flow passage area is zero. When the flow passage 5 is open, the contraction side chamber R1 and the expansion side chamber R2 communicate, and therefore, when the shock absorber 1 performs an expansion operation in this condition, the fluid passes through the flow passage 5 so as to be discharged into the reservoir R. Hence, resistance is applied to the flow of fluid in accordance with the flow passage area of the damping force adjustment mechanism V.

Next, a driving part that causes the valve body 7 to advance and retreat relative to q21asp-05he valve seat 6 will be described.

As noted above, the valve body 7 is driven by the stepper motor 8. A feed screw mechanism S is interposed between the stepper motor 8 and the valve body 7. The feed screw mechanism S drives the valve body 7 by converting a rotary motion of the stepper motor 8 into an advancing/retreating direction motion of the valve body 7. The feed screw mechanism S includes a screw member 20 coupled to be incapable of rotating but capable of moving in the axial direction to a shaft 8a of the stepper motor 8, which is fitted to the enlarged diameter portion 9f of the hollow portion 9a of the valve housing 9, and a nut member 21 which is formed in a tubular shape and fixed to the enlarged diameter portion 9f of the hollow portion 9a, and to which the screw member 20 is screwed.

More specifically, the screw member 20 is formed in a shaft shape, and includes a shaft insertion hole 20a that is open from a stepper motor 8 side end portion serving as a base end side and a screw portion 20b provided on an outer periphery of an anti-motor side end portion serving as a tip end side. The screw member 20 is formed such that a cross-section of the shaft insertion hole 20a does not take the shape of a perfect circle. A cross-section of the shaft 8a of the stepper motor 8 is shaped to fit the cross-section of the shaft insertion hole 20a.

The nut member 21 is formed in a tubular shape and fixed to the enlarged diameter portion 9f of the hollow portion 9a. A screw portion 21a that is screwed to the screw portion 20b of the screw member 20 is provided in an inner periphery of the nut member 21. The screw member 20 is screwed to the nut member 21 such that a tip end thereof projects from a lower end of the nut member 21 and contacts the valve body 7.

Hence, when the stepper motor 8 is driven, the shaft 8a rotates, causing the screw member 20 to rotate relative to the nut member 21. As a result, the shaft 8a moves in the axial direction (a vertical direction in FIG. 1) relative to the nut member 21. Meanwhile, the valve body 7 is biased in the separation direction from the valve seat 6 by the coil spring 19, as described above. Therefore, when the stepper motor 8 is driven to move the screw member 20 to the valve seat 6 side, the valve body 7 is pushed by the screw member 20 so as to advance to the valve seat 6 side. Conversely, when the stepper motor 8 is driven to move the screw member 20 in the separation direction from the valve seat 6, the valve body 7 is pushed by the coil spring 19 so as to retreat from the valve seat 6.

The stepper motor 8 is attached to the outer periphery of the valve housing 9 by a screw portion provided on an outer peripheral side thereof. The stepper motor 8 is disposed to project from an upper end opening portion of the vehicle body side tube 10. The stepper motor 8 is sandwiched between an annular outer peripheral nut member 22 that is engaged to the flange 9g and a closed-top tube-shaped cap 23 that is screwed to the outer peripheral nut member 22 so as to cover an open end of the valve housing 9, and thus fixed to the valve housing 9. The cap 23 includes an opening portion 23a that opens sideward. A connector 8b of the stepper motor 8 faces the outside through the opening portion 23a in the cap 23. Hence, the connector 8b of the stepper motor 8 and an external power supply, not shown in the figures, can be connected to a power line, not shown in the figures, via the opening portion 23a, and as a result, power can be fed to the stepper motor 8 from the exterior of the vehicle body side tube 10.

During expansion of the shock absorber 1, in which the piston 3 moves in one direction (upward in FIG. 1) relative to the cylinder 2, resistance is applied to the flow of fluid moving from the contraction side chamber R1, which is caused to contract by the piston 3, into the expansion side chamber R2 by the damping passage 13, and resistance is applied to the flow of fluid traveling from the contraction side chamber R1 toward the reservoir R by the damping force adjustment mechanism V. During expansion, therefore, the shock absorber 1 generates expansion side damping force using the damping passage 13 and the damping force adjustment mechanism V. Fluid is supplied to the expansion side chamber R2, which is enlarged during expansion, from the reservoir R via the suction passage 16 provided in the bottom member 14. As a result, volume variation in the cylinder 2 occurring when the piston rod 4 retreats from the cylinder 2 during expansion of the shock absorber 1 is compensated for.

During contraction of the shock absorber 1, on the other hand, in which the piston 3 moves in another direction (downward in FIG. 1) relative to the cylinder 2, resistance is applied to the flow of fluid moving from the contraction side chamber R1, which is caused to contract by the piston 3, into the expansion side chamber R2 by the damping passage 13. Further, an amount of fluid corresponding to a volume reduction in the cylinder 2 caused by infiltration of the cylinder 2 by the piston rod 4 is discharged from the contraction side chamber R1 into the reservoir R via the contraction side damping passage 15 of the bottom member 14. Accordingly, volume variation in the cylinder 2 occurring when the piston rod 4 infiltrates the cylinder 2 during contraction of the shock absorber 1 is compensated for, and resistance is also applied to the flow of fluid by the contraction side damping passage 15. Hence, during contraction, the shock absorber 1 generates contraction side damping force using the damping passage 13 and the contraction side damping passage 15. At this time, the fluid is prevented from flowing through the flow passage 5, and therefore the damping force adjustment mechanism V does not contribute to generation of the contraction side damping force.

Furthermore, the flow passage area of the damping force adjustment mechanism V can be varied by driving the valve body 7. With the shock absorber 1, therefore, the expansion side damping force generated during expansion can be adjusted.

Here, a case of damping force adjustment in which the flow passage 5 is completely blocked by energizing the stepper motor 8 to drive the valve body 7 from a condition in which the valve body 7 is separated from the valve seat 6 such that the flow passage 5 is open will be investigated.

When the shock absorber 1 performs an expansion operation such that the fluid passes through the flow passage 5, the valve body 7 is caused to approach the valve seat 6, leading to a gradual reduction in the flow passage area of the damping force adjustment mechanism V. Accordingly, a resultant force of a thrust generated by a pressure (to be referred to hereafter as an "upstream pressure") in the flow passage 5 on an upstream side of the damping force adjustment mechanism V and a fluid force generated by a flow of fluid passing between the valve body 7 and the valve seat 6 acts in a direction for separating the valve body 7 from the valve seat 6. The upstream pressure increases as the flow passage area of the damping force adjustment mechanism V decreases. Further, as the flow passage area of the damping force adjustment mechanism V decreases, a flow speed of the passing fluid increases, leading to an increase in the fluid force. Hence, the resultant force of the upstream pressure and the fluid force increases as the flow passage area of the damping force adjustment mechanism V decreases.

A maximum flow rate of the fluid passing through the flow passage 5 and a maximum value of the upstream pressure are assumed in advance from specifications of the vehicle to which the shock absorber 1 is applied and a damping characteristic required of the shock absorber 1. A step-out boundary position, which is a valve body position at which step-out may occur in the stepper motor 8 in a situation where the flow passage area is reduced as the valve body 7 approaches the valve seat 6 and the valve body 7 continues to move toward the valve seat 6, can be determined from conditions such as the maximum flow rate of the fluid passing through the flow passage 5, the maximum value of the upstream pressure, and an output torque of the stepper motor 8. In other words, when the valve body 7 moves to the valve seat 6 side beyond the step-out boundary position, depending on an expansion condition of the shock absorber 1, the resultant force of the upstream pressure and the fluid force may overcome the torque of the stepper motor 8 such that step-out occurs.

Figure 3:
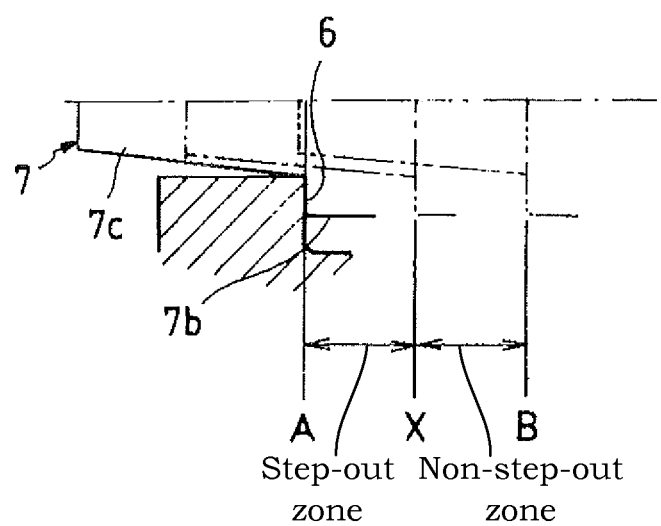
FIG. 3 is a view illustrating a step-out zone and a non-step-out zone of the shock absorber according to this embodiment of this invention.

Hence, as shown in FIG. 3, using a step-out boundary position X, a zone between a seated position A and the step-out boundary position X is set as a step-out zone and a zone between the step-out boundary position X and a maximum separation position B is set as a non-step-out zone. The step-out zone is a zone in which step-out may occur when the valve body 7 is caused to move toward the valve seat 6 side by the stepper motor 8, as described above. The non-step-out zone, on the other hand, is a zone in which the torque of the stepper motor 8 is not overcome by the resultant force of the upstream pressure and the fluid force, and therefore step-out does not occur even when the valve body 7 moves toward the valve seat 6 side.

In a case where the valve body 7 is positioned in the non-step-out zone, the stepper motor 8 does not step out even when the valve body 7 approaches the valve seat 6. Indeed, when the valve body 7 is moved in the separation direction from the valve seat 6, the resultant force of the upstream pressure and the fluid force acts in a direction for assisting separation of the valve body 7, and therefore the stepper motor 8 does not step out. Hence, when the valve body 7 is to be moved within the non-step-out zone, the stepper motor 8 should be energized such that the valve body 7 moves by a desired movement distance. More specifically, the stepper motor 8 is driven by pulse signals transmitted at specific periods, and therefore, in the non-step-out zone, it is sufficient to energize the stepper motor 8 by transmitting thereto a minimum number of pulse signals required to move the valve seat 7 by a required distance, i.e. without taking step-out into consideration.

In a case where the valve seat 7 passes through the step-out zone to the seated position seated on the valve seat 6, on the other hand, the stepper motor 8 is energized to move the valve body 7 by a distance that is at least twice the distance between the valve body 7 and the valve seat 6 while the valve seat 7 is in the step-out zone. More specifically, for example, when the valve body 7 is in the step-out zone, 48 pulse signals are required to move the valve body 7 by a distance for seating the valve body 7 on the valve seat 6 from a separated position separated from the valve seat 6, and 100 pulse signals can be generated per second, at least 96 pulse signals, i.e. twice the number of pulse signals required to move the valve body 7 by the distance for seating the valve body 7 on the valve seat 6 from the separated position separated from the valve seat 6, are applied to the stepper motor 8. An energization time corresponding to 96 pulse signals is 0.96 seconds, and therefore the stepper motor 8 is energized for at least 0.96 seconds.

Figure 4:
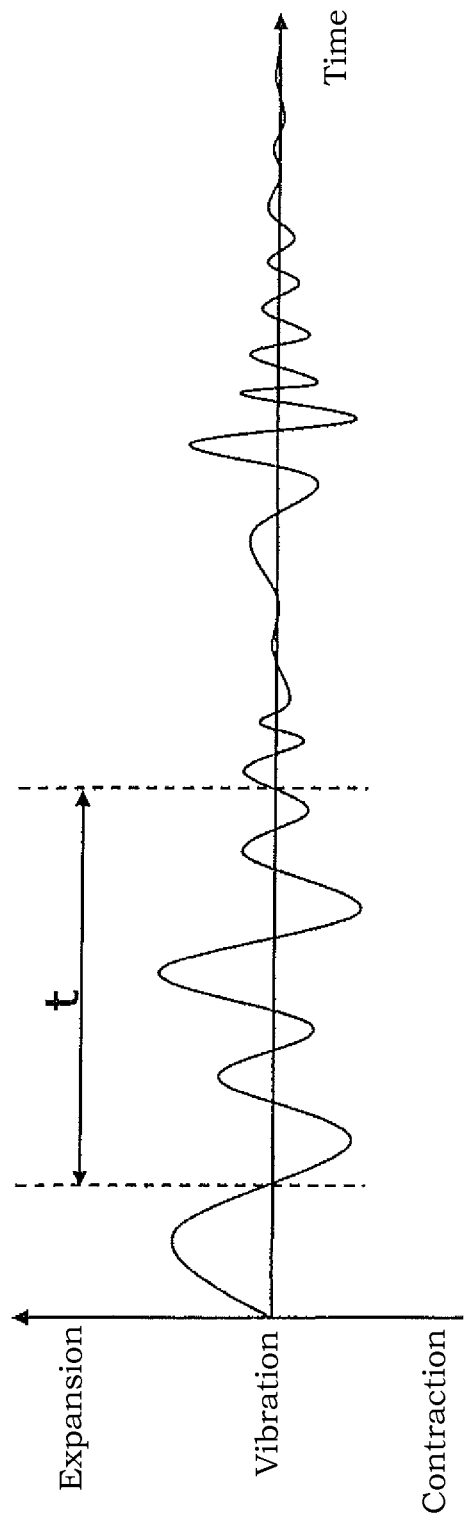
FIG. 4 is a view illustrating expansion and contraction generated by vibration of the shock absorber according to this embodiment of this invention.

Here, the shock absorber 1 expands and contracts repeatedly in response to vibration input from a road surface while the saddle-ridden vehicle travels. As shown in FIG. 4, therefore, focusing on the vibration of the shock absorber 1 over a time t having an arbitrary length during travel, expansion operations and contraction operations are performed in equal numbers. Meanwhile, the fluid flows through the flow passage 5 only when the shock absorber 1 performs the expansion operation.

Hence, when the valve body 7 is in the step-out zone in a situation where the valve body 7 has been driven from a condition in which the flow passage 5 is open such that the flow passage 5 is completely blocked while travel is underway in the saddle-ridden vehicle and the shock absorber 1 is expanded due to vibration, the stepper motor 8 is energized for a time required to move the valve body 7 twice the distance needed to seat the valve body 7 on the valve seat 6. In this case, the contraction operation is underway in the shock absorber 1 for half the energization time, and therefore the fluid does not flow through the flow passage 5. Accordingly, the resultant force of the upstream pressure and the fluid force generated during fluid passage does not act on the valve body 7.

The stepper motor 8 is energized to move the valve body 7 by a distance that is at least twice the distance from the separation position to the seated position seated on the valve seat 6. In other words, when the valve body 7 is in the step-out zone and the valve body 7 is to be driven to the seated position seated on the valve seat 6, the energization time of the stepper motor 8 is set at no less than twice the time required to move the valve body 7 by the distance from the separated position to the seated position seated on the valve seat 6.

Hence, according to this invention, when the valve body 7 is in the step-out zone, the energization time of the stepper motor 8 is set at no less than twice the time required to drive the valve body 7 by the distance from the separated position to the seated position seated on the valve seat 6. Further, since the fluid does not pass through the flow passage 5 for half the energization time, the valve body 7 can be driven in a no-load condition, excluding a biasing force of the coil spring 19, during this time. As a result, the valve body 7 can be seated reliably on the valve seat 6, thereby blocking the flow passage 5.

In other words, since the valve body 7 can be seated reliably on the valve seat 6, step-out of the stepper motor 8 can be corrected. As a result, step-out correction can be performed on the stepper motor 8 even during travel.

According to the shock absorber 1, therefore, the flow passage 5 can be blocked, enabling increases in the flow passage area adjustment width of the damping force adjustment mechanism V and the damping force adjustment width. As a result, riding comfort on the vehicle can be improved, and since step-out correction is performed even during travel, a desired damping force can be generated accurately.

Further, the torque required of the stepper motor 8 need only be large enough to overcome the biasing force of the coil spring 19 so that the valve body 7 can be pressed against the valve seat 6, and therefore a large torque that can overcome the resultant force of the upstream pressure of the fluid passing through the flow passage 5 and the fluid force is not required. Hence, the size of the stepper motor 8 does not need to be increased even in a case where blockage of the flow passage 5 is required. Moreover, since the size of the stepper motor 8 does not have to be increased, the stepper motor 8 can be installed in the saddle-ridden vehicle more easily, and a cost benefit is obtained.

Furthermore, when the valve body 7 is driven to separate from the valve seat 6 and when the valve body 7 is driven in the non-step-out zone, the stepper motor 8 need only be energized to move the valve seat 7 by an equal distance to the required movement distance of the valve seat 7, and therefore a damping force modification response is not impaired.

Further, in a case where the valve body 7 is caused to retreat from the valve seat 6, the resultant force of the upstream pressure of the fluid passing through the flow passage 5 and the fluid force acts in a direction for causing the valve body 7 to retreat from the valve seat 6 not only when the shock absorber 1 is contracted such that the valve seat 7 is in a no-load condition but also when the shock absorber 1 is expanded. Therefore, the stepper motor 8 does not step out while the valve body 7 retreats. As a result, the valve body 7 can be positioned in a desired position reliably.

In the embodiment described above, a situation in which damping force adjustment is performed continuously was described, but this invention is not limited thereto, and damping force adjustment may be performed in steps. A case in which damping force adjustment is performed in steps will now be described.

Figure 5:
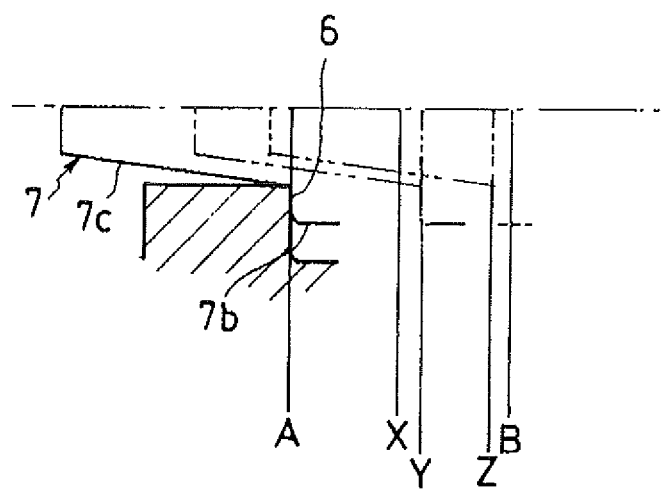
FIG. 5 is a view illustrating a plurality of valve body stop positions in the shock absorber according to this embodiment of this invention.

To adjust the damping force in steps, a valve body stop position must be set in advance within the non-step-out zone. The valve body stop position is set in a plurality of positions depending on a number of steps by which damping force adjustment is to be modified. As shown in FIG. 5, for example, when the damping force is to be modified in three steps, namely hard, medium, and soft, first, a condition in which the valve body 7 is in the seated position A is set as a hard position. The reason for this is that when the valve body 7 is in the seated position A such that the flow passage 5 is blocked, maximum damping force is generated. Next, two valve body stop positions Y, Z at which a medium damping force and a soft damping force are respectively generated are set in the non-step-out zone. Hence, when the damping force is modified in three steps, the two valve body stop positions Y, Z in which the valve body 7 stops are set in the non-step-out zone in addition to the condition in which the valve body 7 is in the seated position A.

To ensure that the medium damping force is larger than the soft damping force, the medium valve body stop position Y of the valve body 7 is provided further toward the valve seat 6 side than the soft valve body stop position Z of the valve body 7. It should be noted that the soft valve body stop position Z does not have to be set in the maximum separation position B.

When the valve body 7 is moved within the step-out zone in the seating direction toward the valve seat 6, the valve seat 7 is seated reliably by energizing the stepper motor 8 in consideration of the possibility of step-out so that the valve body 7 is moved by a distance that is at least twice the required movement distance. When the valve body 7 moves toward the valve seat 6 side in the step-out zone, however, the stepper motor 8 may or may not step out. Therefore, when a valve body stop position is set in the step-out zone, the valve body 7 may not stop in the set valve body stop position. Hence, the valve body stop positions Y, Z are provided in the non-step-out zone but not in the step-out zone.

When the valve body 7 is seated on the valve seat 6 from the medium valve body stop position Y, which is the closest position to the step-out boundary position of the valve body stop positions Y, Z, the valve body 7 is moved by at least twice the distance required to move the valve seat 7 to the seated position A.

As regards movement of the valve body 7 in the separation direction from the seated position A, on the other hand, there is no danger of step-out occurring during either movement of the valve body 7 through the step-out zone or movement of the valve body 7 through the non-step-out zone, and therefore the stepper motor 8 is energized to move the valve body 7 by the required movement distance.

When the damping force is modified from hard to medium, the stepper motor 8 does not step out, and therefore the stepper motor 8 is energized to move the valve body 7 by a distance between the seated position A, which serves as the position of the valve body 7 when the damping force is hard, and the medium valve body stop position Y. Further, when the damping force is modified from medium to soft or from soft to medium, the respective valve body stop positions Y, Z are set in the non-step-out zone, and therefore there is no danger of step-out in the stepper motor 8. Accordingly, the stepper motor 8 may be energized to move the valve body 7 by a distance between the medium valve body stop position Y and the soft valve body stop position Z.

When the damping force is modified from medium to hard, on the other hand, the valve body 7 must be moved toward the valve seat 6 through the step-out zone, in which the possibility of step-out occurring in the stepper motor 8 exists. Therefore, the stepper motor 8 is energized to move the valve body 7 by twice the distance between the medium valve body stop position Y and the seated position A serving as the position of the valve body 7 when the damping force is hard. Further, when the damping force is modified from soft to hard, the valve body 7 passes through the medium valve body stop position Y, and therefore the stepping motor 8 should be energized to move the valve body 7 by the distance between the medium valve body stop position Y and the soft valve body stop position Z from the soft valve body stop position Z to the medium valve body stop position Y, and the energized to move the valve body 7 by at least twice the distance between the medium valve body stop position Y and the seated position A in the zone extending from the medium valve body stop position Y to the seated position A serving as the position of the valve body 7 when the damping force is hard.

In a case where the medium valve body stop position Y is set in the non-step-out zone rather than in the step-out boundary position X serving as the boundary between the step-out zone and the non-step-out zone, and the valve body 7 is moved from the medium valve body stop position Y to the seated position A, the valve body 7 moves to the seated position A by entering the step-out zone after passing through the non-step-out zone. In this case, the stepper motor 8 may be energized to move the valve body 7 by the distance between the medium valve body stop position Y and the step-out boundary position X from the medium valve body stop position Y to the step-out boundary position X, and then energized to move the valve body 7 by m times (where m is a number greater than 1) the distance between the step-out boundary position X and the seated position A after reaching the step-out zone. Further, the stepper motor 8 may be energized to move the valve body 7 by m times the distance between the medium valve body stop position Y and the seated position A.

In both cases, the valve body 7 can be seated reliably on the valve seat 6 even when the stepper motor 8 steps out midway. When the stepper motor 8 is energized to move the valve body 7 by at least twice the distance between the medium valve body stop position Y and the seated position A, however, the energization time is longer, and therefore the valve body 7 can be moved to the seated position more reliably, enabling an improvement in the reliability of step-out correction.

Furthermore, in the embodiment described above, damping force adjustment is switched in three stages, but this invention is not limited thereto, and damping force adjustment may be switched in four or more stages. When a case in which the valve body 7 is in the seated position such that the flow passage 5 is closed is included in the number of stages and the number of stages is set at N (where N is an integer of two or more), N-1 valve body stop positions may be set in the non-step-out zone. When the valve body stop position closest to the step-out boundary position is set as a boundary stop position and the valve body 7 is to be moved to the seated position, step-out correction can be performed reliably by energizing the stepper motor 8 to move the valve body 7 by at least twice the distance required to move the valve body 7 from the boundary stop position to the seated position.

In the embodiment described above, the damping force adjustment mechanism V allows the fluid to pass through the flow passage 5 only when the shock absorber 1 expands, and therefore functions as a damping force generation element that generates expansion side damping force in the shock absorber 1. The damping force adjustment mechanism V is therefore capable of adjusting the expansion side damping force of the shock absorber 1. Alternatively, the damping force adjustment mechanism V may be set to allow the fluid to pass through the flow passage 5 only when the shock absorber 1 contracts, thereby functioning as a damping force generation element that generates contraction side damping force in the shock absorber 1 and adjusts the contraction side damping force. In other words, by configuring the connecting passage 4d provided in the piston coupling portion 4c to connect the hollow portion 4b to the expansion side chamber R2 instead of the contraction side chamber R1, the damping force adjustment mechanism V can adjust the contraction side damping force. With this configuration, the flow passage 5 can be set to allow the fluid to pass only during the contraction operation of the shock absorber 1, and therefore the valve body 7 can be seated on the valve seat 6 by energizing the stepper motor 8 to move the valve body 7 by at least twice the distance required to seat the valve body 7 on the valve seat 6, as described above. As a result, similar actions and effects to those of the shock absorber 1 described above, in which the flow passage 5 is set to allow the fluid to pass only during expansion, can be obtained.

Further, the valve seat 6 is provided on the tip end of the piston rod 4, and the valve housing 9 is provided to house the valve body 7. The flow passage 5 penetrates the piston rod 4 and connects either the contraction side chamber R1 or the expansion side chamber R2 in the shock absorber main body D to the reservoir R provided on the exterior of the cylinder 2. The vehicle body side tube 10 is coupled to the vehicle body of the saddle-ridden vehicle, the axle side tube 11 is coupled to the vehicle wheel of the saddle-ridden vehicle, the piston rod 4 of the shock absorber main body D is coupled to the vehicle body side tube 10 via the valve housing 9, and the cylinder 2 is coupled to the axle side tube 11. Furthermore, the stepper motor 8 is fixed to the valve housing 9 and disposed to project from the vehicle body side tube 10. As a result, the valve body 7 and the stepper motor 8 are disposed in close proximity, and therefore the valve body 7 can be driven without interposing an elongated control rod or the like. Hence, the valve body 7 can be driven to a desired position accurately, enabling an improvement in damping force controllability, and power feeding to the stepper motor 8 from the outside can be performed easily, leading to improvements in convenience and versatility.

Moreover, respective structures of the valve body 7, the valve seat 6, and the flow passage 5 of the damping force adjustment mechanism V are not limited to those described above, and may be subjected to design modifications and alterations as long as the actions and effects of this invention are still obtained. For example, the valve body 7 is not limited to a needle valve, and may be a poppet valve or the like.

Further, the shock absorber main body D may be configured either to generate damping force only during expansion in a case where the damping force adjustment mechanism V generates damping force during expansion of the shock absorber 1, or to generate damping force only during contraction in a case where the damping force adjustment mechanism V generates damping force during contraction of the shock absorber 1.

Although the invention has been described above with reference to certain embodiments, the invention is not limited to the embodiments described above. Modifications and variations of the embodiments described above will occur to those skilled in the art, within the scope of the claims.

The contents of Tokugan 2011-139045, with a filing date of Jun. 23, 2011 in Japan, are hereby incorporated by reference.

The embodiments of this invention in which an exclusive property or privilege is claimed are defined as follows:

1. A shock absorber comprising:
a shock absorber main body having
a cylinder housing
a fluid,
a piston that is inserted into the cylinder housing to be free to slide and divides an interior of the cylinder housing into a contraction side chamber and an expansion side chamber, and
a piston rod inserted into the cylinder and coupled to the piston; and
a damping force adjustment mechanism having
a flow passage that allows the fluid from the cylinder housing to pass during only one of an expansion operation and a contraction operation of the shock absorber main body,
a valve seat provided midway in the flow passage, a valve body capable of advancing and retreating relative to the valve seat, and
a stepper motor that is configured to adjust a flow passage area by driving the valve body to advance and retreat relative to the valve seat, wherein
a valve body position in which step-out may occur in the stepper motor if the valve body is moved further toward the valve seat therefrom is set as a step-out boundary position, and
a zone between a seated position in which the valve body is seated on the valve seat and the step-out boundary position is set as a step-out zone, and
when the valve body is to be moved to the seated position through the step-out zone, the stepper motor is energized to move the valve body by a distance that is at least twice a distance to the seated position.

2. The shock absorber as defined in claim 1, wherein a zone between a maximum separation position in which the valve body is maximally separated from the valve seat and the step-out boundary position is set as a non-step-out zone, and
when the valve body is to be moved through the non-step-out zone, the stepper motor is energized to move the valve body by an equal distance to a desired movement distance.

3. The shock absorber as defined in claim 1, wherein a plurality of valve body stop positions are set in the non-step-out zone and a valve body stop position closest to the step-out boundary position, from among the plurality of valve body stop positions, is set as a boundary stop position, and
when the valve body is to be moved to the seated position, the stepper motor is energized to move the valve body by a distance that is at least twice a distance from the boundary stop position to the seated position.

4. The shock absorber as defined in claim 1, wherein the valve seat is provided on a tip end of the piston rod, and
the flow passage penetrates the piston rod and connects either the contraction side chamber or the expansion side chamber in the shock absorber main body to a reservoir provided on an exterior of the cylinder.

5. The shock absorber as defined in claim 4, further comprising:
a vehicle body side tube coupled to a vehicle body of a saddle-ridden vehicle;
an axle side tube coupled to a vehicle wheel of the saddle-ridden vehicle; and
a valve housing that houses the valve body,
wherein the piston rod is coupled to the vehicle body side tube via the valve housing,
the cylinder housing is coupled to the axle side tube, and
the stepper motor is fixed to the valve housing and disposed to project from an upper end opening portion of the vehicle body side tube.

6. The shock absorber as defined in claim 1, wherein the stepper motor is energized by pulse signals received at a specific period.

7. The shock absorber as defined in claim 1, wherein the stepper motor is energized for a duration greater than or equal to a duration required to drive the valve body from the step-out zone to the seated position.

8. The shock absorber as defined in claim 1, wherein the valve body is a needle valve or a poppet valve.

* * * * *